(12) United States Patent
Hanayama

(10) Patent No.: US 8,619,347 B2
(45) Date of Patent: Dec. 31, 2013

(54) COPYING APPARATUS

(75) Inventor: Yukiyoshi Hanayama, Inazawa (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 539 days.

(21) Appl. No.: 12/908,447

(22) Filed: Oct. 20, 2010

(65) Prior Publication Data

US 2011/0096380 A1   Apr. 28, 2011

(30) Foreign Application Priority Data

Oct. 23, 2009   (JP) ................................. 2009-244501

(51) Int. Cl.
   *H04N 1/46*   (2006.01)
(52) U.S. Cl.
   USPC ............................ 358/501; 358/504; 399/301
(58) Field of Classification Search
   USPC ............... 358/1.9, 500, 501, 504, 518; 399/9, 399/298, 299, 301, 367
   See application file for complete search history.

(56) References Cited

U.S. PATENT DOCUMENTS

| | | | |
|---|---|---|---|
| 5,189,441 A | | 2/1993 | Fukui et al. |
| 6,280,105 B1 * | | 8/2001 | Iida ................. 400/74 |
| 7,333,758 B2 * | | 2/2008 | Munakata et al. ........... 399/299 |
| 7,426,352 B2 * | | 9/2008 | Moriyama et al. ........... 399/43 |
| 7,440,706 B2 * | | 10/2008 | Moriyama et al. ........... 399/43 |
| 2004/0046981 A1 * | | 3/2004 | Taka et al. ............... 358/1.9 |
| 2004/0125392 A1 | | 7/2004 | Ohmori |
| 2004/0136025 A1 * | | 7/2004 | Moriyama et al. ........... 358/1.14 |
| 2005/0190407 A1 * | | 9/2005 | Yokoyama .............. 358/2.1 |
| 2006/0182472 A1 * | | 8/2006 | Munakata et al. ........... 399/299 |
| 2007/0165255 A1 * | | 7/2007 | Takeuchi .............. 358/1.9 |
| 2008/0088883 A1 * | | 4/2008 | Yoshida .............. 358/300 |
| 2008/0130030 A1 * | | 6/2008 | Okunishi et al. ........... 358/1.9 |
| 2008/0145087 A1 * | | 6/2008 | Itou .................. 399/70 |
| 2008/0239400 A1 | | 10/2008 | Yoshida |
| 2009/0016749 A1 * | | 1/2009 | Mashiba ............... 399/39 |
| 2009/0035029 A1 * | | 2/2009 | Kobayashi ............. 399/298 |
| 2009/0128848 A1 * | | 5/2009 | Kamisuwa ............. 358/1.15 |
| 2009/0141298 A1 | | 6/2009 | Kushida |

(Continued)

FOREIGN PATENT DOCUMENTS

| | | |
|---|---|---|
| EP | 0 998 119 A2 | 5/2000 |
| EP | 1 104 167 A2 | 5/2001 |

(Continued)

OTHER PUBLICATIONS

Extended European Search Report dated Nov. 3, 2011 from related European Patent Application No. 10013866.8.

(Continued)

*Primary Examiner* — Kimberly A Williams
(74) *Attorney, Agent, or Firm* — Scully, Scott, Murphy & Presser, P.C.

(57) ABSTRACT

A copying apparatus with a color copy function includes: a reading unit configured to read images on a document; an input unit configured to input commands from a user; an image forming unit configured to form a mark for image adjustment, perform an image adjustment on the image read by the reading unit based on the formed mark for image adjustment and print the adjusted image; and a judging unit configured to trigger the image forming unit to form the mark for image adjustment if the command for executing color copying is input into the input unit.

14 Claims, 9 Drawing Sheets

(56) References Cited

U.S. PATENT DOCUMENTS

| | | | |
|---|---|---|---|
| 2009/0225342 A1* | 9/2009 | Ogasawara | 358/1.9 |
| 2009/0237706 A1* | 9/2009 | Miyajima | 358/1.14 |
| 2010/0003041 A1* | 1/2010 | Otsuka | 399/49 |

FOREIGN PATENT DOCUMENTS

| | | |
|---|---|---|
| JP | 4-13163 A | 1/1992 |
| JP | 6-175449 | 6/1994 |
| JP | A-09-208137 | 8/1997 |
| JP | A-11-46289 | 2/1999 |
| JP | A-11-194673 | 7/1999 |
| JP | 11-327254 | 11/1999 |
| JP | 2001-13753 | 1/2001 |
| JP | A-2002-072761 | 3/2002 |
| JP | A-2002-116586 | 4/2002 |
| JP | 2004-109879 | 4/2004 |
| JP | 2005-173040 | 6/2005 |
| JP | A-2006-163153 | 6/2006 |
| JP | 2006-282779 | 10/2006 |
| JP | A-2007-010789 | 1/2007 |
| JP | 2007-65377 | 3/2007 |
| JP | 2007-190862 A | 8/2007 |
| JP | 2007-199304 A | 8/2007 |
| JP | 2007-219089 | 8/2007 |
| JP | 2007-219174 | 8/2007 |
| JP | A-2008-102204 | 5/2008 |
| JP | A-2008-276011 | 11/2008 |
| JP | A-2009-134149 | 6/2009 |
| JP | A-2009-244615 | 10/2009 |

OTHER PUBLICATIONS

Official Action dated Aug. 23, 2011 received from the Japanese Patent Office in 2009-244501, together with an English-language translation.

Office Action dated Apr. 3, 2013 received from the Chinese Patent Office in related Chinese Patent Application No. 201010287479.3, together with an English language translation.

Notification of Reasons for Refusal dated Dec. 22, 2011 received from the Japanese Patent Office in related application 2008-091349, together with an English-language translation.

Notification of Reasons for Refusal dated Jul. 30, 2013 received from the Japanese Patent Office in related Japanese Patent Application No. 2012-029163, together with an English language translation.

* cited by examiner

COPYING APPARATUS

CROSS-REFERENCE OF APPLICATION

This application is based upon and claims the benefit of priority of Japanese Patent Application No. 2009-244501 filed on Oct. 23, 2009, the contents of which are incorporated herein by reference in its entirety.

BACKGROUND OF THE INVENTION

The present invention relates to a copying apparatus with a color copy function. Specifically, the present invention relates to a copying apparatus which performs image adjustment for keeping the quality of color images.

Conventionally, in copying apparatus with a color copy function, images in respective colors of cyan (C), magenta (M), yellow (Y), and black (K) are formed and the images in the respective colors are superimposed to form a color image. Thus, a color image is formed by superimposing a plurality of images, so that copying apparatus perform image adjustment so as to prevent the positions and densities of the respective images from being deviated from each other. As the image adjustment, for example, a resist pattern as an image pattern for image adjustment is prepared for each color, deviation amounts (adjustment values) between a reference color resist pattern and resist patterns in colors to be examined are acquired, and based on the adjustment values, position deviations of the images are corrected.

For acquiring the above-mentioned adjustment values, resist patterns must be formed, so that printing is restricted during the adjustment value acquiring operation. Therefore, there is a known problem that if the adjustment value acquiring operation is performed when executing copy processing, printing is suspended during the adjustment value acquiring operation, and the processing time is extended. Therefore, for example, it is known that the adjustment value acquiring operation is interrupted halfway to shorten the processing time.

SUMMARY OF THE INVENTION

However, the above-mentioned conventional copying apparatus have the following problem. That is, printing is performed by interrupting the adjustment value acquiring operation, so that printing is performed without updating the adjustment values. Therefore, the image quality is sacrificed.

The present invention has been made to solve the problem of the above-mentioned conventional copying apparatus. That is, an object of the present invention is to provide a copying apparatus which realizes both improvement in image quality and a shorter copy processing time.

According to an aspect of the invention, a copying apparatus with a color copy function includes:

a reading unit configured to read images on a document;
an input unit configured to input commands from a user;
an image forming unit configured to form a mark for image adjustment, perform an image adjustment on the image read by the reading unit based on the formed mark for image adjustment and print the adjusted image; and
a judging unit configured to trigger the image forming unit to form the mark for image adjustment if the command for executing color copying is input into the input unit.

A copying apparatus of the present invention forms images that become marks for image adjustment if it is judged that commands necessary for executing color copying have been input. "Image adjustment" corresponds to, for example, processing for adjusting the positions and densities of images in the respective colors when forming a color image. "Commands necessary for executing color copying" correspond to depressing of a button for commanding the start of color copying, a switching operation to a screen on which a detailed setting of color copying is performed, and inputs to the screen. At least one of these commands is determined in advance as a command that triggers mark formation. "Marks" are image patterns for image adjustment, and known resist patterns (image patterns for position deviation adjustment) and density patterns (image pattern for density adjustment) are applicable. Based on the marks, adjustment values for image adjustment are acquired.

Specifically, in the copying apparatus of the present invention, in response to an input of a command necessary for color copying, mark formation for image adjustment (that is, adjustment value acquiring operation) is carried out. Accordingly, during document reading, or during a setting operation before starting document reading, the adjustment value acquiring operation can be performed concurrently. As a result, it can be expected that the adjustment value acquiring operation will be finished earlier and printing can be performed earlier based on the latest adjustment values.

Preferably, the copying apparatus has a black-and-white copy function, and the command for executing color copying is unnecessary for executing black-and-white copying. That is, the image adjustment for adjusting deviations from images in other colors becomes unnecessary in black-and-white copying. Therefore, if starting mark formation when performing black-and-white copying, this adversely influences the productivity of the black-and-white copying. Therefore, the adverse influence on the black-and-white copying can be avoided by making the command as a trigger of mark formation an unnecessary command when executing the black-and-white copying.

Preferably, the reading unit includes: an automatic feeding unit that automatically conveys the document; and a detection unit configured to detect whether or not the document is set in the automatic feeding unit. Accordingly, setting of documents in an automatic feeding unit can be used as a condition for performing the adjustment value acquiring operation. Moreover, it is preferable that a detection unit judges whether or not the number of document sheets set in the automatic feeding unit is more than a threshold value, and only if the detection unit judges that the number of document sheets is more than the threshold value, the image forming unit forms marks. That is, in the case of copying of one or two sheets, the influence on the image quality is small. Therefore, the adjustment value acquiring operation is not performed if copying a small number of sheets so as to avoid deterioration in productivity. In addition, as a method for acquiring the number of document sheets, for example, manual input, thickness detection, and weight detection can be used.

Preferably, the image forming unit forms the mark only if the number of images to be aggregately printed on one document sheet is more than the threshold value. That is, if the number of images to be aggregately printed in aggregate printing (that is, 2-in-1 printing or 4-in-1 printing, etc.) is large, a plurality of document sheets must be read for creating print data of one print page, so that it is highly possible that reading takes time. Therefore, the downtime of the printing unit until the start of printing becomes long. Therefore, by performing the adjustment value acquiring operation at this downtime, effective utilization of the downtime can be expected.

Preferably, the image forming unit forms the mark only if the reading unit requires a reading preparation operation.

That is, it takes time until starting a reading during a preparation operation for reading (for example, the warm-up time of the light source), and as a result, the downtime of the printing unit until starting the printing becomes long. Therefore, by performing the adjustment value acquiring operation during this downtime, effective utilization of the downtime can be expected.

Preferably, the image forming unit forms the mark only if a setting of a copy image quality is higher than a standard. That is, when reading of a document for at least one print page is finished, printing becomes available. In the case where low image quality is allowed, it is preferable that productivity is given preference and the adjustment value acquiring operation is not performed.

Preferably, if the input unit inputs a print start command, the image forming unit interrupts formation of the mark if a mark formation progress is not more than a prescribed value. Then, at the point when printing becomes available, a mark formation progress status is acquired. Then, if it takes time until the mark formation is finished, it is preferable that productivity is given preference and the adjustment value acquiring operation is not performed. In other words, if the mark formation will be finished in a while, it is preferable that the image quality is given preference and the adjustment value acquiring operation is continued.

Preferably, the image forming unit does not form the marks during printing of another job. That is, the operation panel is sometimes operated during execution of another job (facsimile or PC printing), however, when marks are formed at this time, it influences the job being executed. Therefore, while another job is executed, the mark formation is not allowed to interrupt the job.

Preferably, the image forming unit forms the mark only if at least one of a work amount, an elapsed time, a temperature change, a humidity change, and mounting of a component since the previous mark formation, satisfies a predetermined condition. That is, if marks are formed unconditionally, excessive marks are formed, so that the colorant is wasted. Therefore, conditions for mark formation are set to limit the mark formation.

Preferably, the image forming unit starts printing the adjusted image after the input unit inputs a color copying start command.

Preferably, the image forming unit includes an image adjustment sensor configured to read the mark for image adjustment.

Preferably, the image forming unit includes a plurality of process units which printing different color images, respectively.

According to the present invention, a copying apparatus that is compatible with both improvement in image quality and a shorter copy processing time is realized.

DETAILED DESCRIPTION OF EXEMPLARY EMBODIMENTS

Hereinafter, a copying apparatus according to exemplary embodiments will be described in detail with reference to the accompanying drawings. In the present embodiment, the present invention is applied to an electrophotographic copying apparatus having a color copy function and a black-and-white copy function.

Entire Configuration of Copying Apparatus

Figure 1:
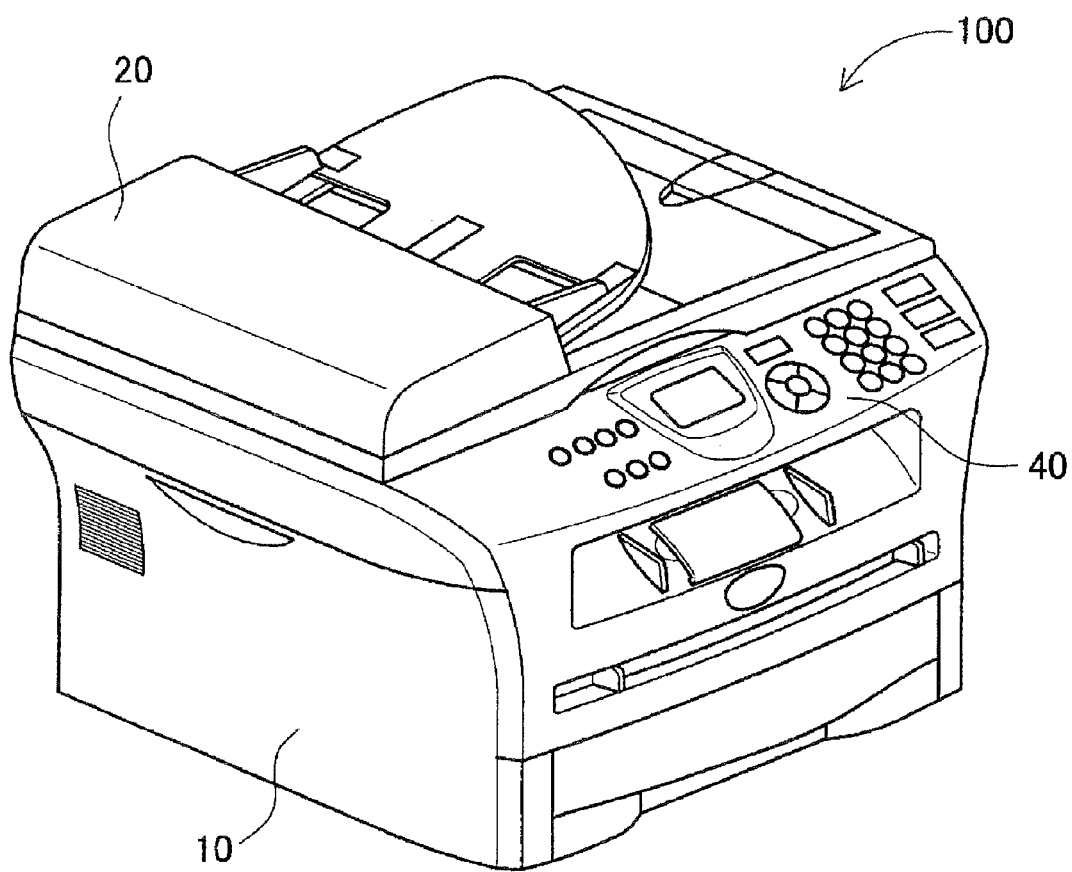
FIG. 1 is a perspective view showing a schematic configuration of a copying apparatus according to an embodiment.

A copying apparatus 100 includes, as shown in FIG. 1, an image forming unit 10 which forms images on sheets, and an image reading unit 20 (an example of a reading unit) which reads images on documents. Moreover, on the front face side of the image reading unit 20, an operation unit 40 (an example of an input unit) including a display unit consisting of a liquid crystal display and a group of buttons including a start key, a stop key, and a numeric keypad, etc., is provided, and this operation unit 40 can display an operation status and enables input operations by a user.

Configuration of Image Forming Unit

Figure 2:
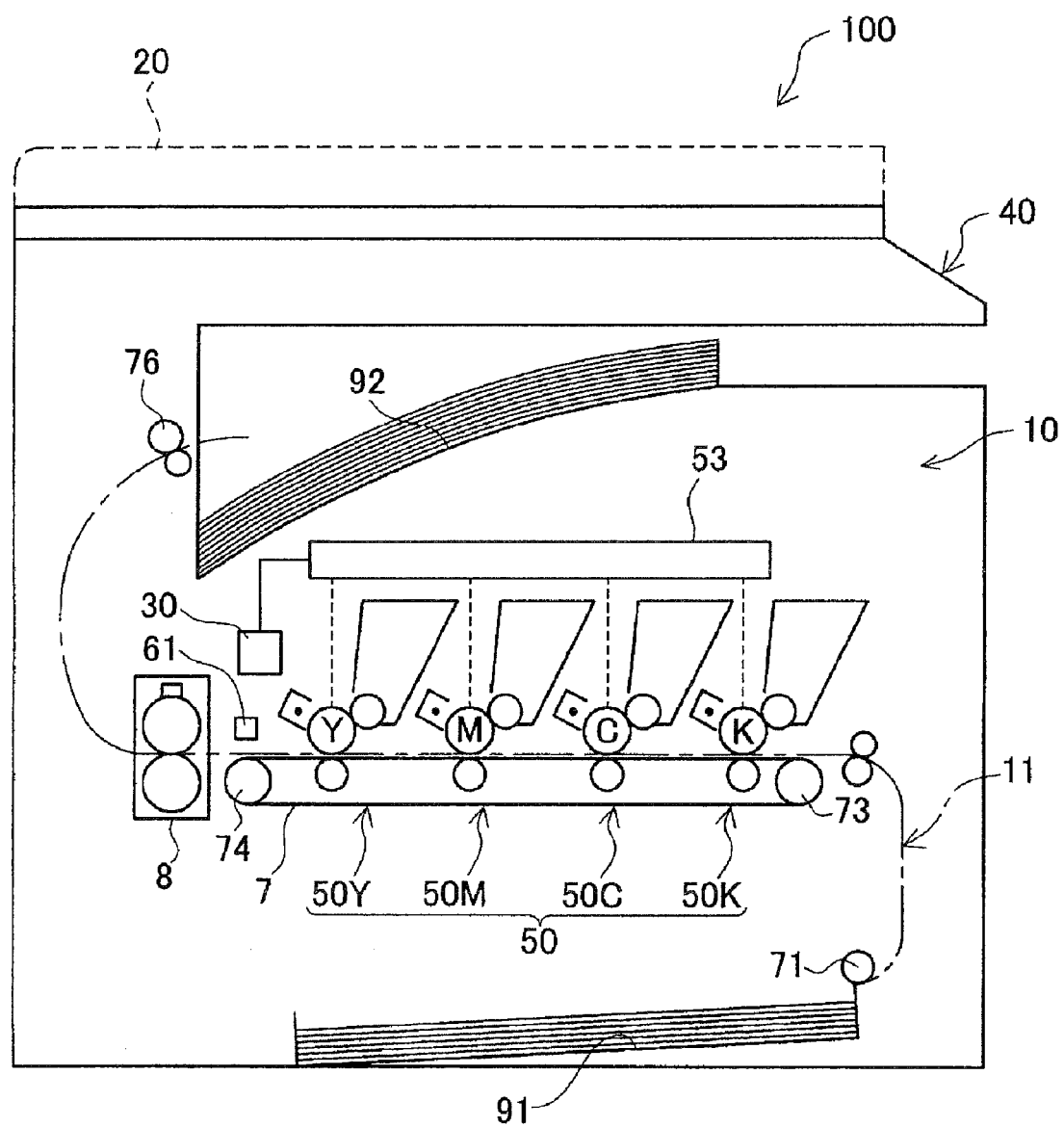
FIG. 2 is a conceptual diagram showing an internal configuration of an image forming unit of the copying apparatus shown in FIG. 1.

The image forming unit 10 includes, as shown in FIG. 2, a process unit 50 which forms a toner image and transfers it onto a sheet, a fixing device 8 which fixes unfixed toner on the sheet, a paper feed tray 91 on which sheets before image formation are placed, and a copy receiving tray 92 on which sheets after image formation are placed.

Inside the image forming unit 10, a substantially S-shaped conveyance path 11 (shown by the dashed line in FIG. 2) is provided so that sheets accommodated in the paper feed tray 91 positioned on the bottom portion are guided to the paper receiving tray 92 on the upper portion via ejection rollers 76 after passing through a paper feed roller 71, the process unit 50, and the fixing device 8.

The process unit 50 can form a color image, and includes process units for the respective colors of yellow (Y), magenta (M), cyan (C), and black (K) juxtaposed. Specifically, the process unit includes a process unit 50Y which forms an image in Y color, a process unit 50M which forms an image in M color, a process unit 50C which forms an image in C color, and a process unit 50K which forms an image in K color.

Further, the image forming unit 10 includes an exposure device 53 which irradiates the respective process units 50Y, 50M, 50C, and 50K with light, a conveyance belt 7 which is suspended and tensioned by conveyance rollers 73 and 74 and conveys sheets to the transfer positions of the respective process units 50Y, 50M, 50C, and 50K, and an image adjustment sensor 61 which detects resist patterns formed on the conveyance belt 7. The respective process units 50K, 50Y, 50M, and 50C form toner images according to the known electrophotographic method.

The image forming unit 10 takes out sheets placed on the paper feed tray 91 one by one and conveys the sheets to the process unit 50, and transfers toner images formed by the process unit 50 onto the sheets. At this time, in a color print mode, toner images are formed by the respective process units 50Y, 50M, 50C, and 50K and superimposed on a sheet. On the other hand, in a black-and-white printing mode, a toner image is formed by only the process unit 50K and transferred onto a sheet. Thereafter, the sheet onto which the toner image has been transferred is conveyed to the fixing unit 8 and the toner image is thermally fixed on the sheet. Then, the sheet after fixing is ejected to the copy receiving tray 92.

The image adjustment sensor 61 is positioned at the downstream of the process units 50Y, 50M, 50C, and 50K, and at the upstream of the fixing device 8 in the sheet conveying direction, and detects resist patterns formed on the conveyance belt 7. That is, in the copying apparatus 100, the respective process units 50Y, 50M, 50C, and 50K form resist patterns as image patterns for image adjustment, and the respective process units 50Y, 50M, 50C, and 50K transfer the resist patterns onto the conveyance belt 7. The image adjustment sensor 61 reads the positions of the respective resist patterns.

In the copying apparatus 100, in order to reduce toner consumption, the image forming unit 10 judges whether the adjustment values for image adjustment requires updating if the copying apparatus accepts a print job. Only if it is judged that updating is necessary, resist patterns are formed. Details of copy control will be described later.

Configuration of Image Reading Unit

Figure 3:
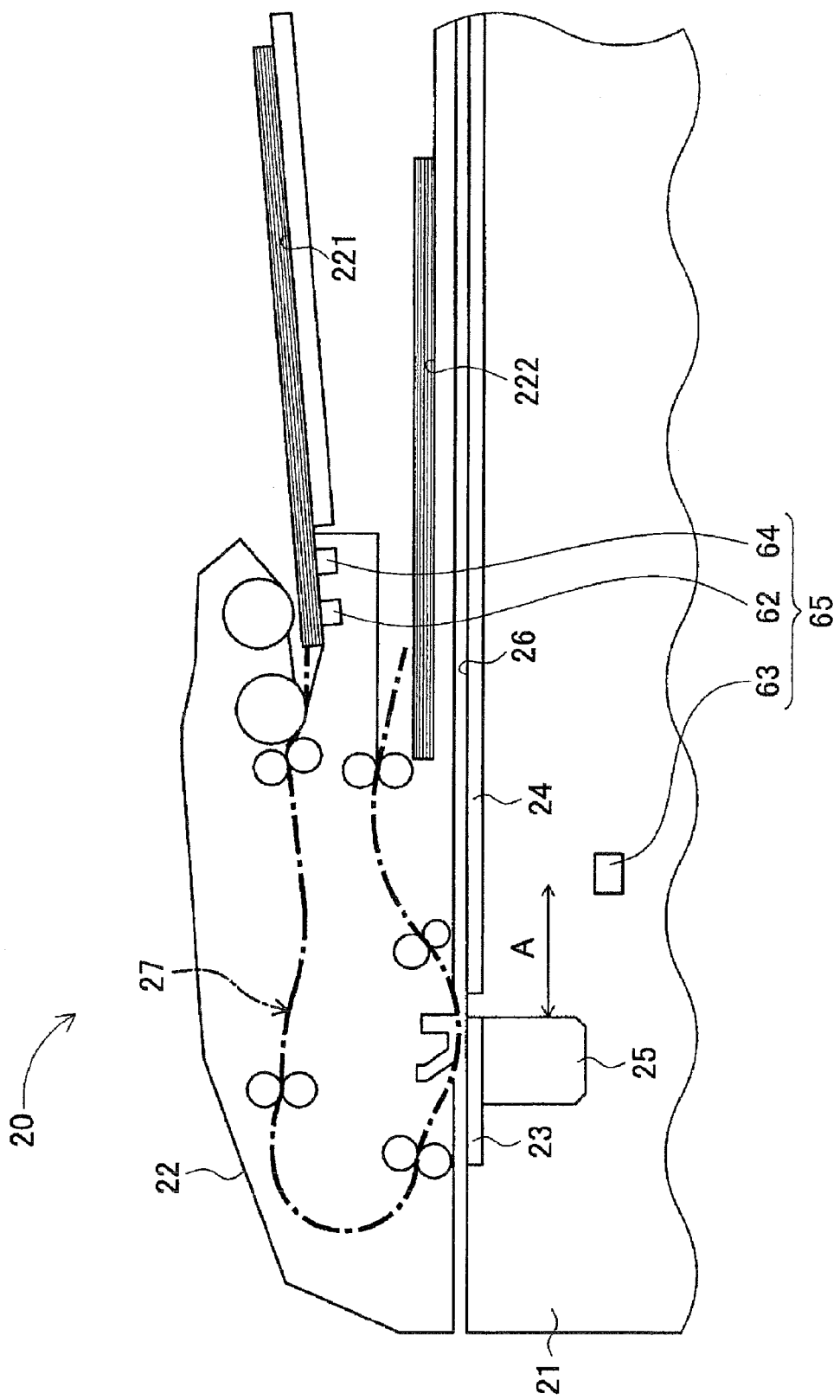
FIG. 3 is a conceptual diagram showing the internal configuration of the image reading unit of the copying apparatus shown in FIG. 1.

The image reading unit 20 includes, as shown in FIG. 3, a scanner unit 21 which reads images on documents, and an ADF (Automatic Document Feeder) 22 which automatically conveys documents. The scanner unit 21 includes transparent platen glasses 23 and 24 positioned on the upper surface thereof, and a CCD unit 25 positioned inside thereof.

The ADF 22 includes a document tray 221 on which documents before being read are placed, and an ejection tray 222 on which read documents are placed. Specifically, the document tray 221 is disposed above the ejection tray 222. The ADF 22 takes out documents placed on the document tray 221 one by one, conveys the documents into a conveyance path 27 inside the ADF 22, and after the documents are read, ejects the documents onto the ejection tray 222.

As a document reading method, there are available a flat bed method (document-fixed scanning) and an ADF method (document-moving scanning). In the case of the flat bed method, documents are placed one by one on the platen glass 24 (hereinafter, referred to as "FB glass 24"). In this state, the CCD unit 25 moves in the vertical scanning direction (orthogonal to the main scanning direction, the arrow A direction of FIG. 3), and at this time, images on the document are read line by line in the main scanning direction. On the other hand, in the case of the ADF method, documents are collectively placed on the document tray 221. Then, the CCD unit 25 moves to a position opposed to the platen glass 23 (hereinafter, referred to as "ADF glass 23") and is fixed there. In this state, documents are conveyed one by one to a position opposed to the ADF glass 23 (reading position), and at this time, images on the document are read line by line in the main scanning direction.

The ADF 22 includes a sensor group 65 (an example of a detection unit) having a first document sensor 62 including a light emitting unit which emits light toward the document tray 221 and a light receiving unit which detects a light receiving amount of the light and optically detects setting of documents on the document tray 221, a second document sensor 63 including a light emitting unit which emits light toward the FB glass 24 and a light receiving unit which detects a light receiving amount of the light and optically detects setting of documents on the FB glass 24, and a weight sensor 64 which detects a weight of a batch of document sheets set on the document tray 221 by detecting a fluctuation amount of a movable piece provided on the document tray 221. The weight sensor 64 is disposed on a document placement surface of the document tray 221 and outputs a detection signal when the document weight is equal to or larger than a threshold value.

Further, the CCD unit 25 is provided with a CCD sensor and a light source consisting of a cold cathode tube. The cold cathode tube to be used as a light source takes a certain preparation time (warm-up time) until image reading becomes possible and emission with a stable luminance is obtained since application of a voltage. Moreover, in the present embodiment, the cold cathode tube is described as an example of a light source, however, any equivalent to the cold cathode tube can also be used as a light source.

Configuration of Operation Unit

Figure 4:
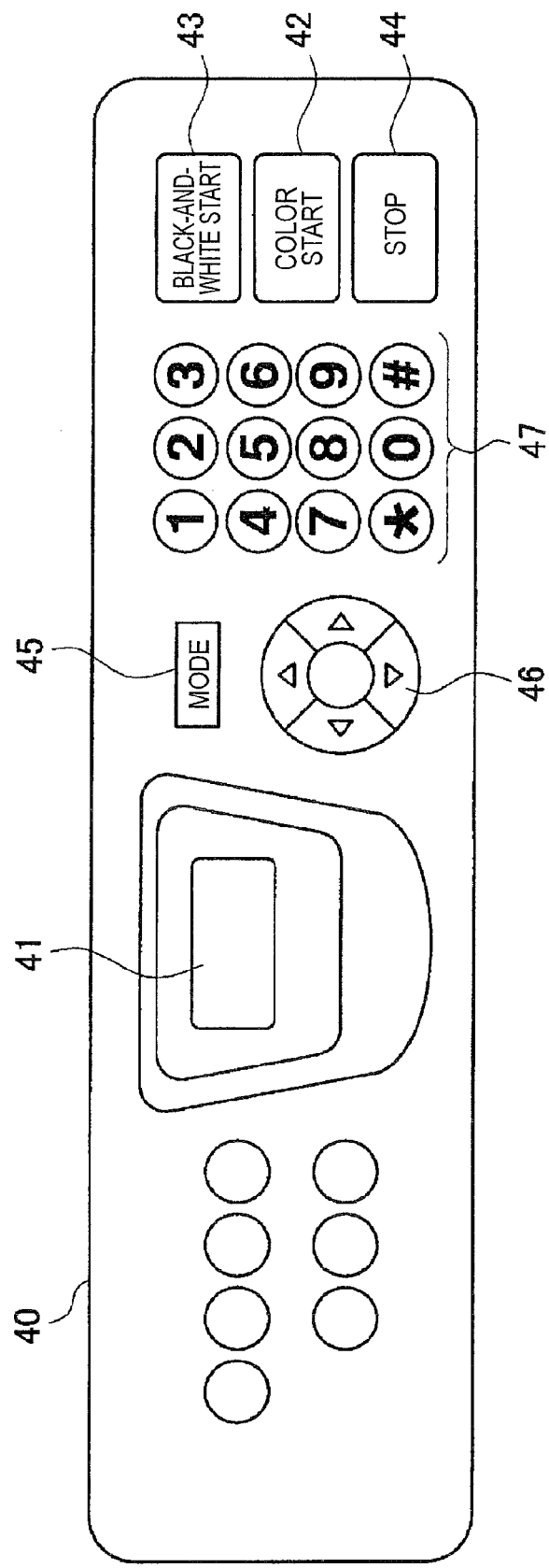
FIG. 4 is a view showing a configuration of an operation unit of the copying apparatus shown in FIG. 1.

The operation unit 40 includes, as shown in FIG. 4, a display panel 41 which displays various setting screens and messages, a color start button 42 which commands a start of copying in a color print mode, a black-and-white start button 43 which commands a start of copying in a black-and-white print mode, a stop button 44 for interrupting a copy operation, a mode switch button 45 for commanding mode switching between the color print mode and the black-and-white print mode, direction buttons 46 to be used for switching of selection of items on a setting screen, and a numeric keypad 47 to be used for inputting numerical values.

In the copying apparatus 100, if a user depresses the color start button 42 without any settings relating to copying, a color copy operation is started with a resolution and the number of images to be aggregately printed of default settings. On the other hand, if a user performs any setting relating to copying before depressing the color start button 42, a color copy operation reflecting the setting is started. Similarly, in a case where a user depresses the black-and-white start button 43, if the user does not perform settings relating to copying, a black-and-white copying operation is started with the default settings, and if a user performs some setting, a black-and-white copying operation reflecting the setting is started.

The operation unit 40 enables inputs of operation settings in a mode selected by the mode switch button 45. That is, on the display panel 41, switching between a color copy setting screen and a black-and-white copy setting screen is performed each time the mode switch button 45 is depressed, and a setting screen of a mode currently selected is displayed.

Electric Configuration of Copying Apparatus

Figure 5:
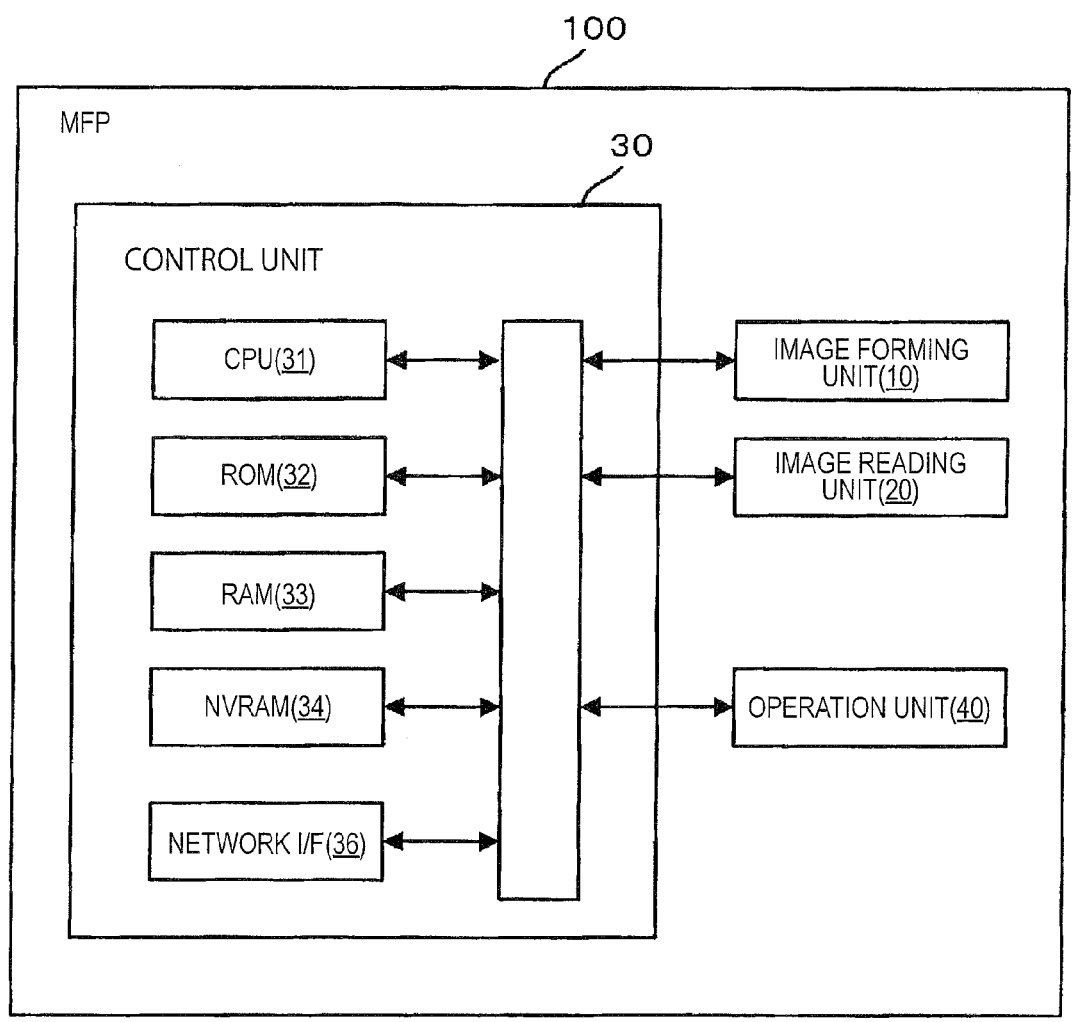
FIG. 5 is a block diagram showing an electric configuration of the copying apparatus shown in FIG. 1.

Subsequently, an electric configuration of the copying apparatus 100 will be described. The copying apparatus 100 includes, as shown in FIG. 5, a control unit 30 including a CPU 31, a ROM 32, a RAM 33, an NVRAM (nonvolatile RAM) 34, an ASIC 35, and a network interface 36. The control unit 30 is electrically connected to the image forming unit 10, the image reading unit 20, and the operation unit 40, etc. The image forming unit 10, the image reading unit 20, and the operation unit 40 are controlled by the control unit 30 and operate independently of each other.

Various control programs for controlling the copying apparatus 100 and various settings and initial values, etc., are stored in the ROM 32. The RAM 33 is used as a work area into which various control programs are read out or a storage area for temporarily storing image data.

The CPU 31 controls the respective components of the copying apparatus 100 (for example, a lighting timing of the exposure device 53, drive motors (not shown) of various rollers constituting the conveyance path 11, and a motor (not shown) for moving the CCD unit constituting the image reading unit 20) via the ASIC 35 based on signals sent from control programs read out from the ROM 32 and various sensors while storing the processing results in the RAM 33 or the NVRAM 34.

The network interface 36 is connected to a network such as a LAN to enable connection with an external device in which a driver for the copying apparatus 100 is installed. The copying apparatus 100 can communicate print jobs via the network interface 36.

Color Copy Control of Copying Apparatus

Subsequently, color copy control of the copying apparatus 100 will be described. The copying apparatus 100 starts color copying if documents are set in the image reading unit 20 and the color start button 42 is depressed.

Color Copy Processing

First Embodiment

Figure 6:
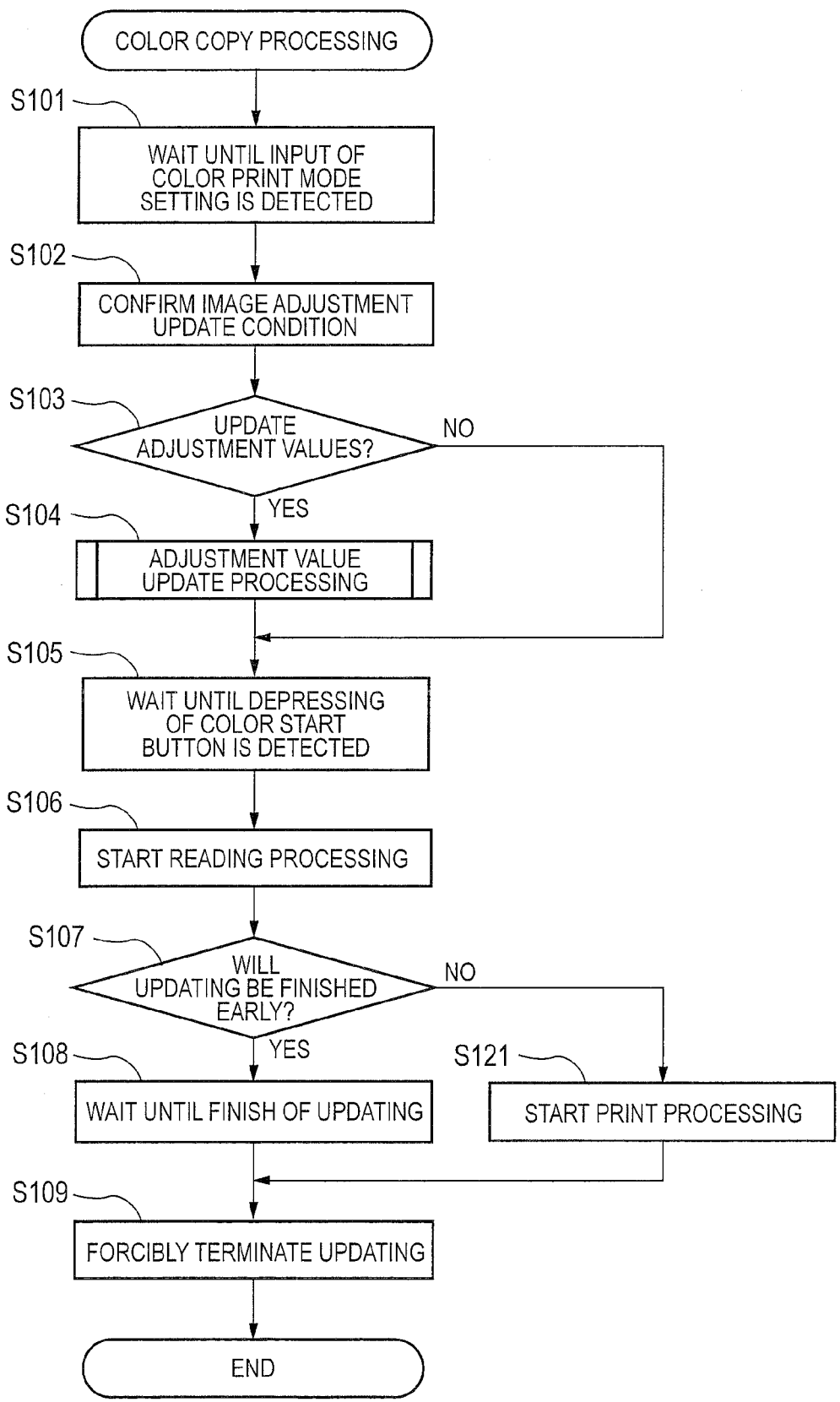
FIG. 6 is a flowchart showing steps of copy processing according to a first embodiment.

Hereinafter, color copy processing (an example of an input unit, a judging unit, a reading unit, and an image forming unit) which realizes color copy control will be described with reference to the flowchart of FIG. 6.

First, the process waits until an input relating to setting of the color print mode is detected (S101). The input relating to the color print mode corresponds to, for example, an operation to set printing conditions in a state where the display panel 41 displays a color print mode setting screen. Alternatively, the input relating to setting of the color print mode may be depressed on a mode switch button 45 for switching from the black-and-white print mode to the color print mode. Alternatively, the input may be depressed on the color start button 42.

After detecting the input relating to the color print mode, an update condition for adjustment values for image adjustment is confirmed (S102). The update condition corresponds to, for example, the number of printed sheets (work amount) since previous updating, an elapsed time, a temperature change or a humidity change inside the machine since the previous updating. Alternatively, the update condition may be the mounting of a component such as a toner cartridge. In the copying apparatus 100, when the adjustment values are updated for each printing, toner consumption increases. On the other hand, even if the adjustment values are not frequently updated, the influence on the image quality is small. Therefore, an update condition for updating the adjustment values for image adjustment is set.

Thereafter, it is judged whether or not the update conditions are satisfied (S103). For example, if the number of printed sheets since the previous updating is equal to or larger than a predetermined number, it is judged that the update condition is satisfied. Alternatively, if an elapsed time since previous updating is equal to or longer than a predetermined time, it is judged that the update condition is satisfied. Alternatively, if a temperature change or a humidity change inside the machine is equal to or greater than a threshold value, it is judged that the update condition is satisfied. If a plurality of update conditions are set, it is judged whether or not at least one of the update conditions is satisfied.

If the update condition is satisfied (S103: YES), adjustment value update processing is performed (S104). If the update condition is not satisfied (S103: NO), without updating the adjustment values for image adjustment, the process shifts to S105.

Figure 7:
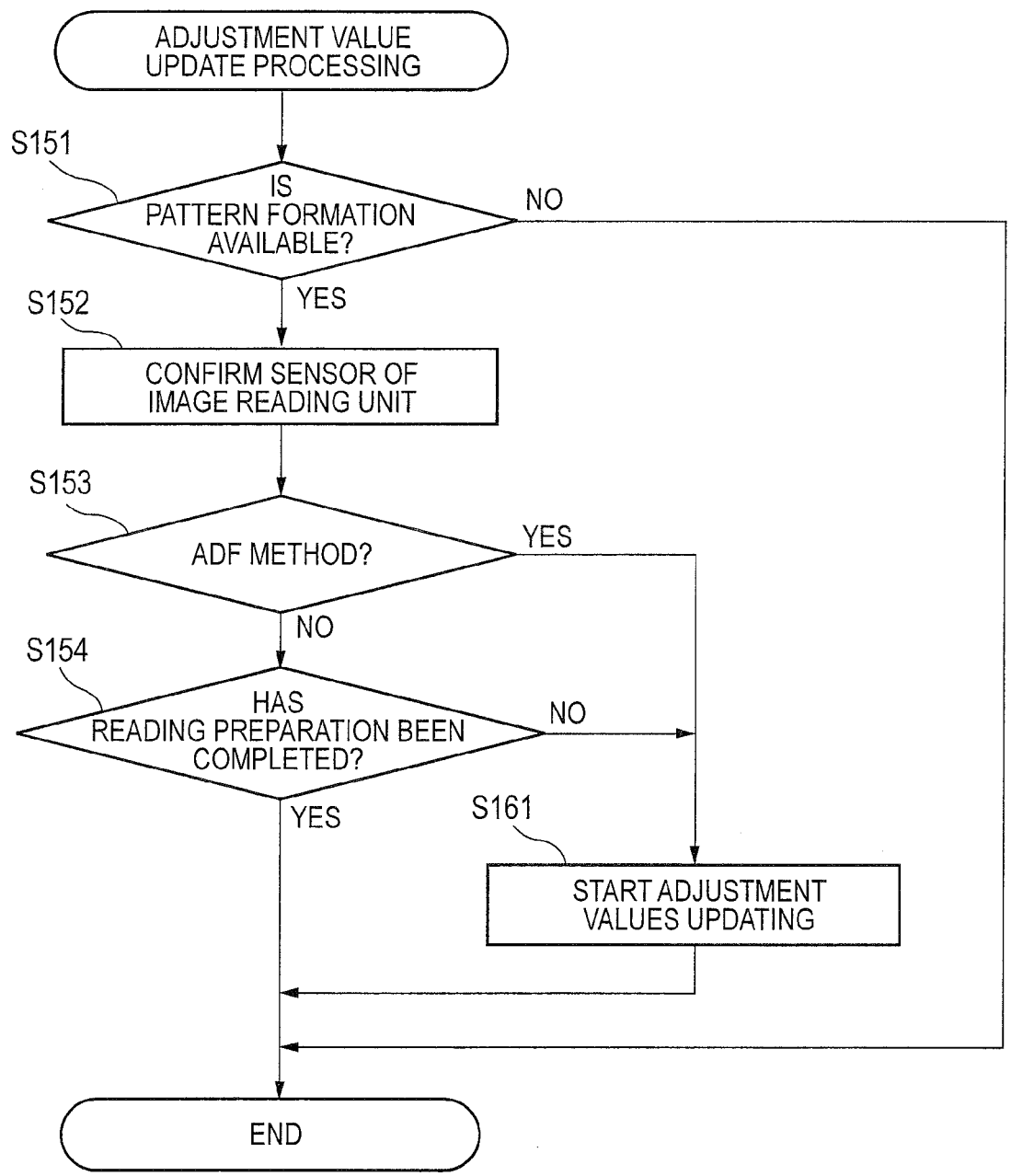
FIG. 7 is a flowchart showing steps of adjustment value update processing according to the first embodiment.

Here, the adjustment value update processing of S104 will be described with reference to the flowchart of FIG. 7. First, it is judged whether or not pattern formation is possible (S151). For updating the adjustment values for image adjustment, resist patterns must be formed by the respective process units 50Y, 50M, 50C, and 50K. Therefore, in a state where printing preparation is not completed in such a case where the image forming unit 10 is being used for another print job (facsimile or PC printing, etc.) or the like, the adjustment values cannot be updated. Therefore, if pattern formation is not possible (S151: NO), the adjustment value update processing is terminated without updating the adjustment values for image adjustment.

On the other hand, if pattern formation is possible (S151: YES), signals from the sensor group 65 of the image reading unit 20 are confirmed (S152). Then, it is judged whether documents were set in the ADF 22 of the image reading unit 20, that is, whether or not an output signal from the first document sensor 62 was detected (S153). In document reading by the ADF 22, a plurality of document sheets are read, so that it is estimated that it will take time until completion of document reading. Therefore, in the case of reading according to the ADF method (S153: YES), update processing of the adjustment values for image adjustment is started (S161).

If reading is not according to the ADF method (S153: NO), it is judged whether or not reading preparation was completed (S154). For example, immediately after the machine is energized, warm-up of a light source of the CCD unit 25 takes time, and the reading preparation has not been completed yet in some cases. In this case, it is estimated that it will take time until reading completion. Therefore, in the case where the reading preparation has not been completed (S154: NO), the update processing of the adjustment values for image adjustment is started (S161). In addition, the order of S153 and S154 may be reversed.

On the other hand, if the reading method is not the ADF method and the reading preparation is completed (S154: YES), it is highly possible that document reading is completed early. Therefore, if the update processing of the adjustment values for image adjustment is started, printing is suspended until updating is finished. Therefore, without updating the adjustment values for image adjustment, the adjustment value update processing is terminated.

Here, the update processing of the adjustment values that is started at S161 will be described briefly. In the update processing of the adjustment values, first, the respective process units 50Y, 50M, 50C, and 50K form resist patterns, and the respective resist patterns are transferred onto the conveyance belt 7. At this time, the respective resist patterns are transferred at predetermined intervals in the belt conveying direction so as not to be superimposed on each other. Thereafter, the image adjustment sensor 61 reads positions of the respective resist patterns. Then, one of C, M, Y, and K is defined as a reference color, and the resist pattern in the reference color and the resist patterns in other colors are compared with each other to acquire position deviation amounts. Adjustment values thus acquired based on the position deviation amounts are updated as new adjustment values. Moreover, the update processing of the adjustment values described here is just an example, so that the processing is not limited to this.

Referring to FIG. 6 again, after the adjustment value update processing of S104 or if the update condition is not satisfied (S103: NO), the process waits until depressing of the color start button 42 is detected (S105). Moreover, in the case where depressing of the color start button 42 has already been detected at S101, the process shifts to S106. After detecting an input, the document reading processing of the image reading unit 20 is started (S106).

Thereafter, after reading for at least one print page is finished, it is judged whether or not the update processing of the adjustment values for image adjustment will be finished early (S107). In the present embodiment, if the progress status of the resist pattern formation satisfies a predetermined condition, it is judged that updating will be finished early. As the predetermined condition, for example, resist patterns of all colors were developed, or resist patterns of three colors were transferred, etc. Cases where update processing is not currently performed such as the cases where update processing has already been finished and update processing was not started in the first place are included in the case where update processing will be finished early.

If it is judged that the update processing will not be finished early (S107: NO), the update processing is forcibly terminated (S121). If the update processing is not finished early, it is highly possible that the printing start is delayed. Therefore, reduction in the copy processing time is given preference and the update processing is interrupted.

On the other hand, if it is judged that the update processing will be finished early (S107: YES), the process waits for the finish of update processing (S108). This is very wasteful if the update processing is terminated although the update processing will be finished soon. On the other hand, if the update processing will be finished early, the influence on the processing time is small. Therefore, after waiting for the finish of the update processing, the process shifts to S109.

After a state where the update processing is not performed is entered, print processing is started (S109). In this print processing, images to which image adjustment was carried out based on the latest adjustment values are formed by the respective process units 50Y, 50M, 50C, and 50K. After the print processing is finished, this process is ended.

Second Embodiment

Subsequently, another embodiment of color copy processing will be described. In the second embodiment, after the color start button 42 is depressed, it is determined whether or not the adjustment values for image adjustment are to be updated based on the setting content of color printing. This is different from the first embodiment in which the first embodiment enables update processing to start in response to a color print setting operation before the color start button 42 is depressed.

Figure 8:
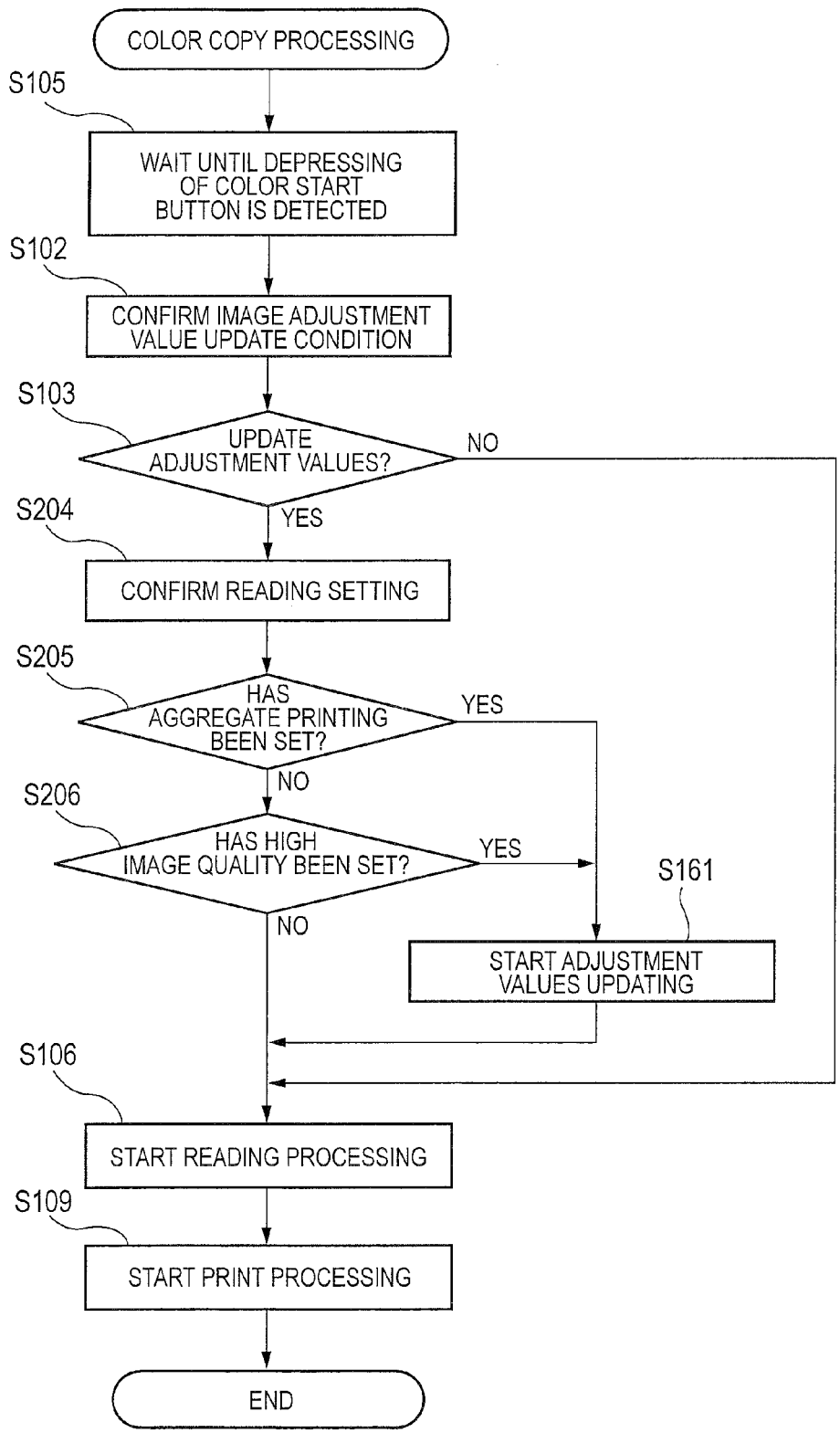
FIG. 8 is a flowchart showing steps of copy processing according to a second embodiment.

Hereinafter, color copy processing of the second embodiment (an example of the input unit, the judging unit, the reading unit, and the image forming unit) will be described with reference to the flowchart of FIG. 8. Further, processing the same as in the first embodiment is designated by the same step number as in the first embodiment, and description thereof is omitted.

First, the process waits until depressing of the color start button 42 is detected (S105). After detecting the input, the update condition for the adjustment values for image adjustment is confirmed (S102). Thereafter, it is judged whether or not the update condition is satisfied (S103). If the update condition is not satisfied (S103: NO), the process shifts to S106 without updating the adjustment values for image adjustment.

If the update condition is satisfied (S103: YES), the setting content made on the setting screen for the color print mode are confirmed (S204). The setting content is, for example, settings of the print quality, toner saving, aggregate printing, and double-side printing.

Next, it is judged whether or not aggregate printing of the number of sheets equal to or larger than a threshold value has been set (S205). If aggregate printing of the number of images equal to or larger than the threshold value is set, many document sheets must be read for creating print data of one print page, so that it is estimated that reading will take time. Therefore, if aggregate printing of the number of images equal to or larger than the threshold value is set (S205: YES), update processing of adjustment values for image adjustment is started (S161).

On the other hand, if aggregate printing of the number of images equal to or larger than the threshold value is not set (S205: NO), it is judged whether or not high image quality has been set (S206). In printing allowing low image quality, it is preferable that productivity is given preference and update processing is not performed. Therefore, if high image quality is set (S206: YES), update processing of adjustment values for image adjustment is started (S161). Moreover, the order of S205 and S206 may be reversed.

On the other hand, if aggregate printing of the number of images equal to or larger than the threshold value is not set and there is no high-quality setting (S206: NO), it is highly possible that document reading will be completed early, and the requirement for image quality is low. Therefore, it is very disadvantageous that update processing of adjustment values for image adjustment is started and printing is suspended until updating is finished. Therefore, the adjustment value update processing is terminated without updating the adjustment values for image adjustment.

Thereafter, document reading processing by the image reading unit 20 is started (S106). Then, after reading for at least one print page is finished, the print processing is started (S109). After print processing is finished, this processing is ended.

Timing Chart

Subsequently, operation sequences of the components (the operation unit 40, the image reading unit 20, the image forming unit 10) of the copying apparatus 100 during color copying according to the first embodiment and the second embodiment will be described in comparison with a conventional example.

Figure 9A:
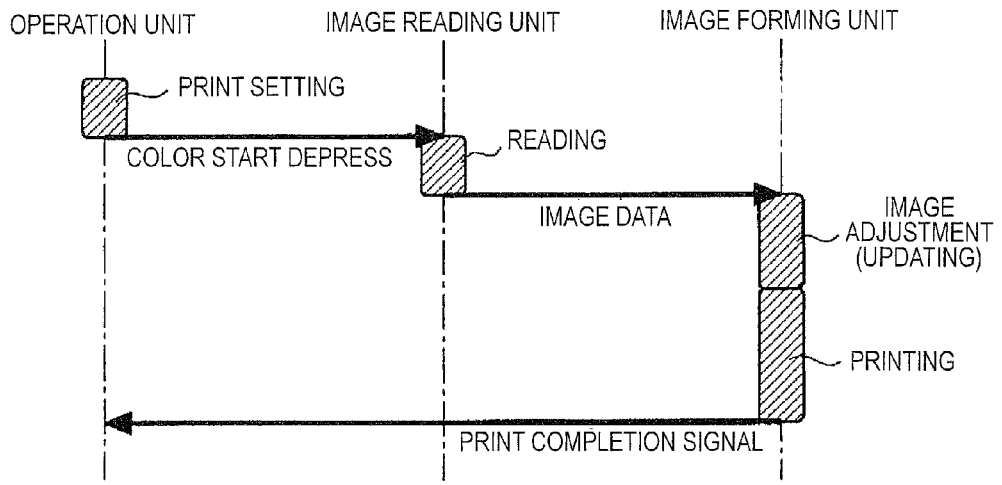
FIGS. 9A to 9C are timing charts showing operation timings of components during copy processing.
Figure 9B:
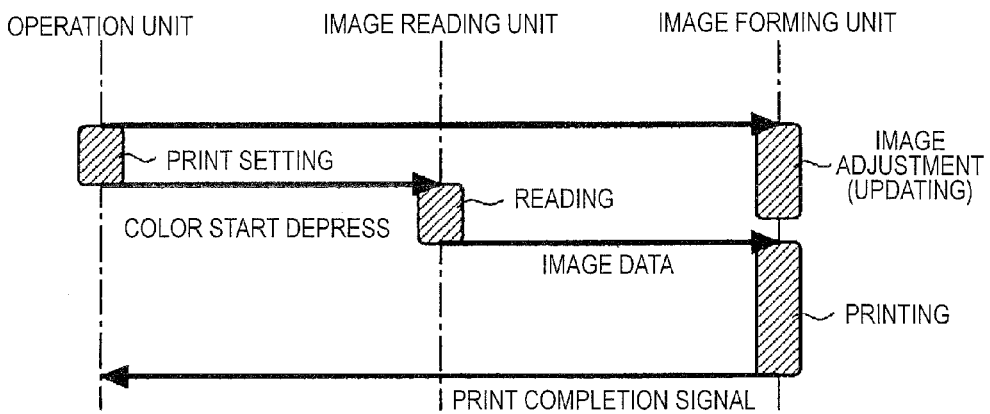
Figure 9C:
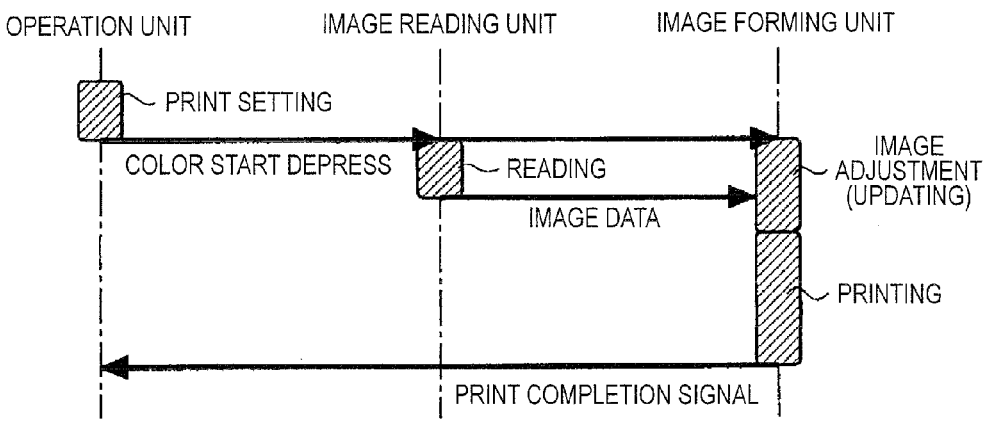

FIG. 9 are timing charts showing work periods of the respective components during color copying. The hatched portions indicate that the components are working. In addition, FIG. 9(A) shows a conventional example, FIG. 9(B) shows the first embodiment in which update processing is performed in response to a setting operation, and FIG. 9(C) shows the second embodiment, respectively. In FIG. 9, the time axis is set downward.

Operations common to the respective embodiments are as follows. First, the operation by the operation unit 40 is finished if the color start button 42 is depressed. Then, in response to depressing of the color start button 42, reading by the image reading unit 20 is started. From the image reading unit 20, read image data is transmitted to the image forming unit 10. In FIG. 9, the time to be taken for reading for the first one print page is expressed as a rectangle. From the image forming unit 10, a print completion signal is output after all print pages are printed.

In the conventional example, each component operates upon waiting for the finish of an operation of another component. That is, the image reading unit 20 operates upon waiting for the finish of the operation of the operation unit 40, and the image forming unit 10 operates upon waiting for image data from the image reading unit 20. That is, in the image forming unit 10, image adjustment (that is, update processing of adjustment values for image adjustment) is started in response to receiving of image data, and printing is started after the image adjustment is finished. In the conventional example, during operation of a certain component, other components do not operate, so that the time from the start of the operation of the operation unit 40 to the finish of printing is long.

On the other hand, in the first embodiment, a start of a color print mode setting operation triggers the image adjustment to start. Therefore, during print setting by using the operation unit 40, and further, during image reading by the image reading unit 20, the image adjustment by the image forming unit 10 is performed concurrently. As a result, the image adjustment may be finished before the reading by the image reading unit 20 is finished. Therefore, it can be expected that the time from the start of the operation of the operation unit 40 to the finish of printing becomes shorter than in the conventional example.

Further, in the second embodiment, depressing of the color start button 42, that is, the start of the image reading operation triggers the image adjustment to start. Therefore, during image reading by the image reading unit 20, image adjustment by the image forming unit 10 is performed concurrently. As a result, the image adjustment may be finished before the reading by the image reading unit 20 is finished. Therefore, even in the second embodiment, it can be expected that the time from the start of the operation of the operation unit 40 to the finish of printing becomes shorter than in the conventional example.

In addition, in the case of black-and-white copying, the processing relating to image adjustment (for example, S102 to S104) is not performed. Therefore, the start of printing is prevented from being delayed due to waiting for updating of adjustment values.

As described in detail above, in the copying apparatus 100, in response to an input of a command necessary for executing color copying (a print setting operation in the color print mode and depressing of the color start button 42, etc.), an adjustment value acquiring operation for image adjustment (that is, formation of resist patterns) is executed. Accordingly, during document reading or during a setting operation before starting document reading, formation of resist patterns is performed concurrently. As a result, it can be expected that the adjustment value acquiring operation will be finished early and printing will be started early based on the latest adjustment values.

Moreover, the present embodiment is merely an example, and does not limit the present invention. Therefore, it is a matter of course that the present invention can be variously altered and varied without departing from the spirit of the present invention. For example, the present invention is applicable to not only copying apparatuss but also other machines having a color copy function such as multi-function printers. Further, the image forming method of the process unit is not limited to the electrophotographic method but may be an ink-jet method.

Further, in the embodiment, start buttons (color start button 42 and black-and-white start button 43) to be exclusively used for color printing and black-and-white printing are provided on the operation unit 40, respectively, however, the configuration is not limited to this. For example, a start button common to color printing and black-and-white printing may be provided. In this case, by depressing the common start button, copying is started in a mode currently selected by the mode switch button 45.

Further, in the embodiment, the modes are switched by one mode switch button 45 of the operation unit 40, however, the configuration is not limited to this. For example, as a button for switching the setting screen, a button for color copying and a button for black-and-white copying may be provided, respectively.

Further, in the embodiment, as a method for acquiring adjustment values, resist patterns are formed on the conveyance belt 7 and the image adjustment sensor 61 reads the resist patterns and automatically calculates adjustment values, however, the configuration is not limited to this. For example, it is also allowed that resist patterns are formed on a sheet and adjustment values are acquired by a user's manual inputs. Moreover, without limiting to the resist patterns, density patterns for density adjustment may be formed.

Further, in the embodiment, in the case of reading by the ADF method, update of the adjustment values is started, however, the configuration is not limited to this. For example, it is also allowed that the number of sheets set in the ADF 22 is also judged, and if the number is judged as equal to or larger than a threshold value, update of the adjustment values is started. The judgment as to whether the number of sheets is equal to or larger than the threshold value can be made based on, for example, a signal from the weight sensor 64. Then, at S153, a requirement for judgment as to whether or not the number of sheets is equal to or larger than the threshold value is added. Accordingly, update of the adjustment values when printing a small number of sheets can be avoided.

Moreover, in the examples described above, the number of document sheets is judged based on the weight of a batch of the document sheets, however, the method for judging the number of document sheets is not limited to this. For example, a sensor which detects the thickness of a batch of the document sheets may be provided and the number of document sheets is judged based on the thickness of the batch of the document sheets. Alternatively, an item for inputting the number of document sheets is provided on the operation unit 40, and based on the input value, the number of document sheets may be judged. Alternatively, an IC tag reader is provided and the number of document sheets may be judged by reading the content of an IC tag attached to the document.

What is claimed is:

1. A copying apparatus with a color copy function comprising:
   a reading unit configured to read an image on a document;
   an input unit configured to input commands from a user;
   an image forming unit configured to form an image;
   a processor; and
   memory storing computer readable instructions, when executed by the processor, causing the copying apparatus to:
   if a command related to color copying is input into the input unit, trigger the image forming unit to form a mark for image adjustment and perform color copying setting according to the input command related to the color copying before a command for starting color copying is input into the input unit; and if the command for starting color copying is input into the input unit, control the reading unit to read the image on the document, perform the image adjustment on the image read by the reading unit based on the mark formed by the image forming unit and control the image forming unit to form the adjusted image.

2. The copying apparatus according to claim 1, wherein the copying apparatus has a black-and-white copy function, and
the command for executing color copying is unnecessary for executing black-and-white copying.

3. The copying apparatus according to claim 1, wherein the reading unit includes:
an automatic feeding unit that automatically conveys the document; and
a detection unit configured to detect whether or not the document is set in the automatic feeding unit.

4. The copying apparatus according to claim 3, wherein the detection unit judges whether the number of document sheets set in the automatic feeding unit is more than a threshold value, and
the image forming unit forms the mark only if the detection unit judges that the number of document sheets is more than the threshold value.

5. The copying apparatus according to claim 1, wherein the image forming unit forms the mark only if the number of images to be aggregately printed on one document sheet is more than the threshold value.

6. The copying apparatus according to claim 1, wherein the image forming unit forms the mark only if the reading unit requires a reading preparation operation.

7. The copying apparatus according to claim 1, wherein the image forming unit forms the mark only if a setting of a copy image quality is higher than a standard.

8. The copying apparatus according to claim 1, wherein the image forming unit includes a plurality of process units which print different color images, respectively.

9. The copying apparatus according to claim 1, wherein the image forming unit does not form the marks during printing of another job.

10. The copying apparatus according to claim 1, wherein the image forming unit forms the mark only if at least one of a work amount, an elapsed time, a temperature change, a humidity change, and mounting of a component since the previous mark formation, satisfies a predetermined condition.

11. The copying apparatus according to claim 1, wherein the image forming unit starts printing the adjusted image after a color copying start command is inputted into the input unit.

12. The copying apparatus according to claim 1, wherein the image forming unit includes an image adjustment sensor configured to read the mark for image adjustment.

13. A copying apparatus with a color copy function comprising:
a reading unit configured to read an image on a document;
an input unit configured to input commands from a user;
an image forming unit configured to form a mark for image adjustment, perform an image adjustment on the image read by the reading unit based on the formed mark for image adjustment and print the adjusted image;
a processor; and
memory storing computer readable instructions, when executed by the processing, causing the copying apparatus to:
trigger the image forming unit to form the mark for image adjustment if the command for executing color copying is input into the input unit; and
control the image forming unit to interrupt formation of the mark if a mark formation progress is not more than a prescribed value if a command for starting color copying is input into the input unit.

14. A copying apparatus with a color copy function comprising:
a reading unit configured to read an image on a document;
an input unit configured to input commands from a user;
an image forming unit configured to form an image;
a processor; and
memory storing computer readable instructions, when executed by the processor, causing the copying apparatus to:
if a command for starting color copying is input into the input unit, control the reading unit to read the image on the document, and control the image forming unit to form a mark for image adjustment so that the image forming unit forms the mark during a time the reading unit reads the image on the document;
perform the image adjustment on the image read by the reading unit; and
control the image forming unit to form the adjusted image.

* * * * *